E. MONTI.
PROCESS OF CONCENTRATING SOLUTIONS.
APPLICATION FILED SEPT. 9, 1904.

919,616.

Patented Apr. 27, 1909.
3 SHEETS—SHEET 1.

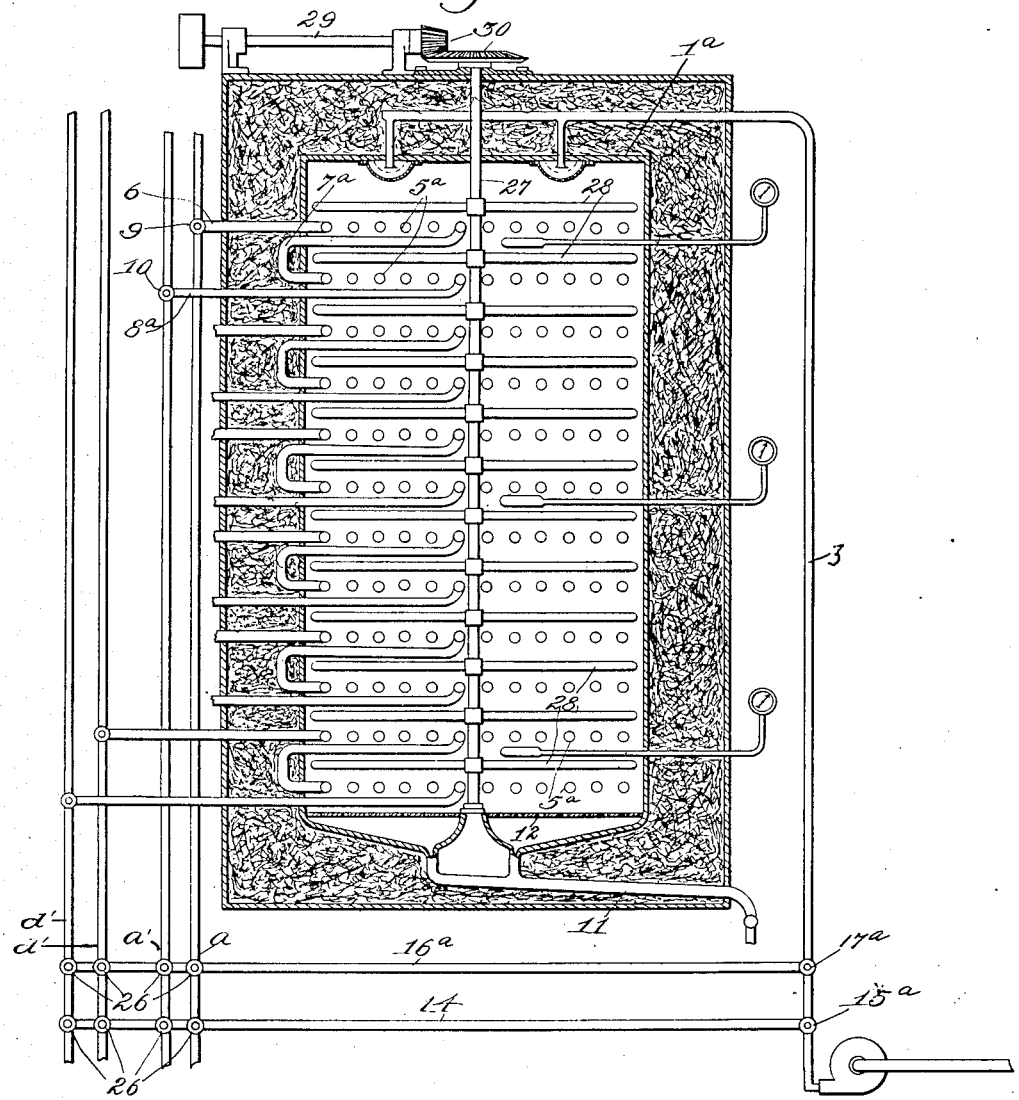

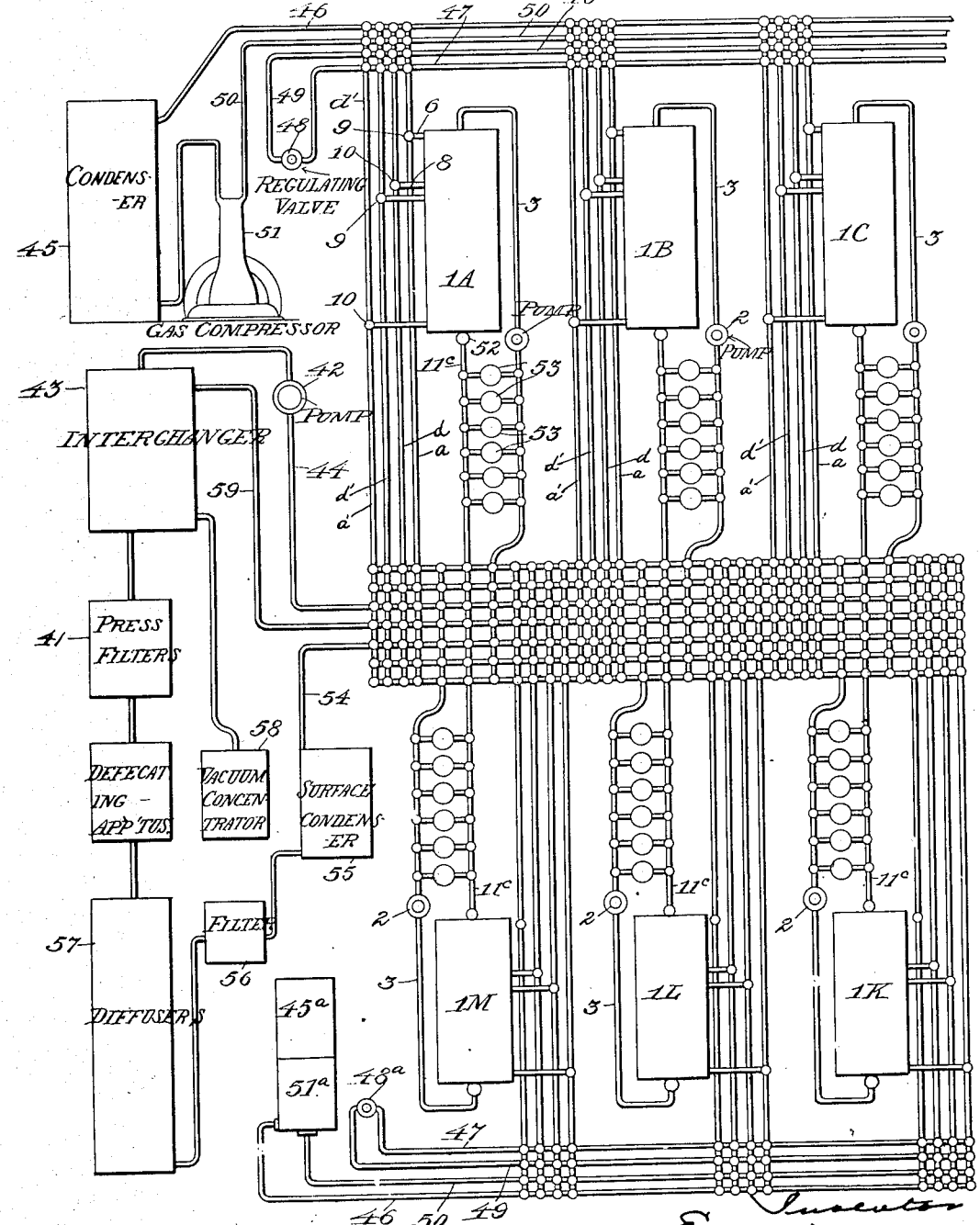

UNITED STATES PATENT OFFICE.

EUDO MONTI, OF TURIN, ITALY.

PROCESS OF CONCENTRATING SOLUTIONS.

No. 919,616.    Specification of Letters Patent.    Patented April 27, 1909.

Application filed September 9, 1904. Serial No. 223,920.

*To all whom it may concern:*

Be it known that I, EUDO MONTI, a subject of the King of Italy, and resident of Via Figlie dei Militari N. 20, Turin, Italy, have invented certain new and useful Improvements in Processes for Concentrating Solutions, of which the following is a specification.

This invention relates to processes for concentrating solutions and more particularly to an improvement for carrying on the process described in my Patent #761,387, dated May 31, 1904, in which the solutions or liquids, (any kind of animal, vegetable or fruit extracts, such as beet sugar, meat, coffee, tea, also mineral solutions and the like) are frozen and the soluble matters are displaced from the ice.

In repeated experiments, I have ascertained that when freezing a solution in a mold or tank in order to concentrate it, much better results are obtained if the freezing is caused to proceed regularly from the top to the bottom of the material. I have also ascertained that the permeability of the frozen solution is an inverse ratio of the percentage of ice crystals present in said solution and the percentage of ice crystals, being the same, is an inverse ratio of the viscosity of the concentrated solution to be displaced from the ice crystals. I have further ascertained that the permeability may be greatly increased and therefore the duration of the displacement shortened by saturating the cooled solution to be frozen with air, dry carbonic acid or other suitable gas which will not alter the solution. I have still further discovered that, it is greatly advantageous to stir the solution while the freezing is going on.

An apparatus adapted for carrying out the above discoveries is illustrated in a division of an application filed by me September 9, 1904, Serial No. 223,919, and to make my process clear I herein illustrate and describe the above mentioned apparatus.

Figure 1:
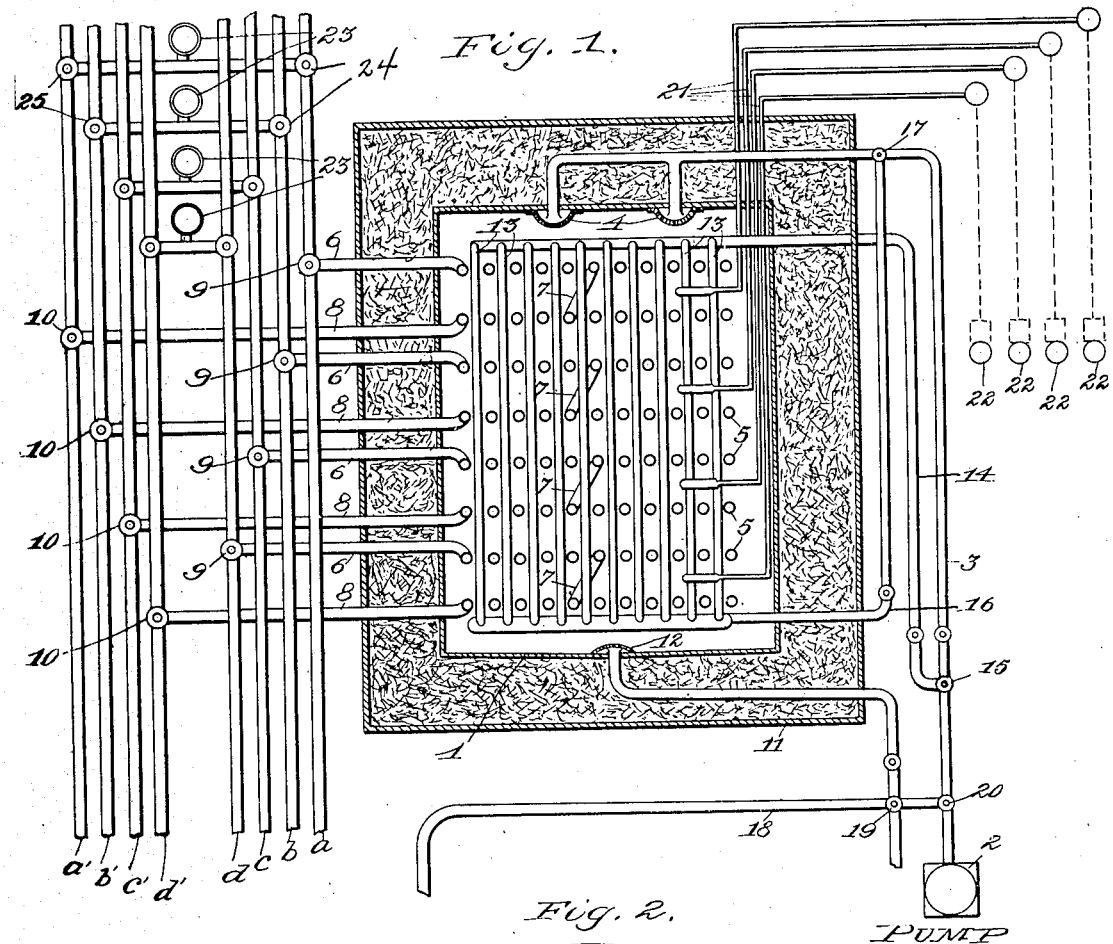
Figure 2:
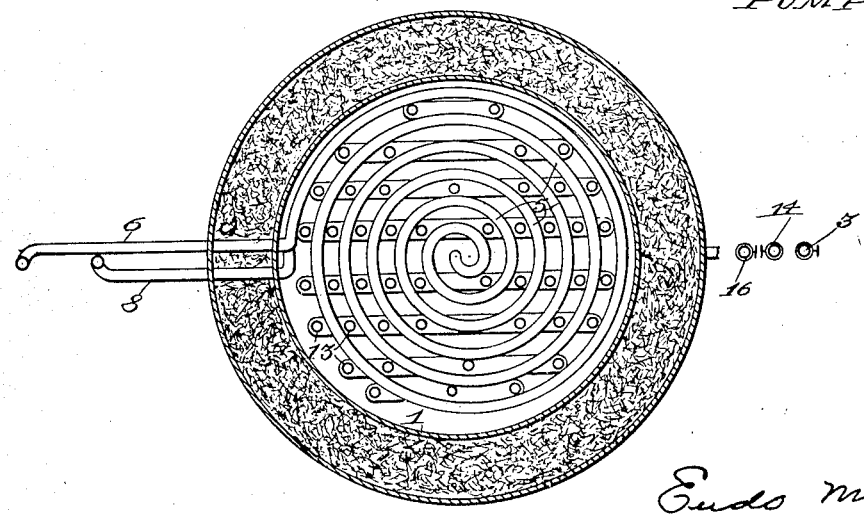

In the drawings: Figure 1 is a vertical section through a freezing tank employed for carrying out my process. Fig. 2 is a horizontal section through said tank. Fig. 3 is a vertical section through another tank in which my invention may be carried out. Fig. 4 shows diagrammatically a sugar factory in which my process may be carried out.

Referring more particularly to Figs. 1 and 2 of the drawings, 1 indicates the freezing tank which is properly insulated and 2 the pump for forcing the liquid to be concentrated or the displacing fluid from a suitable source of supply through pipe 3 into the spreaders 4 at the top of the freezing tank, and from here it passes into the said tank. The tank is provided with an outlet pipe 11 having a perforated plate 12 covering its inner end, and leading to the displaced liquid tanks described in my previous patent and my application filed September 9, 1905, Ser. No. 223919. Located within the tank are a number of superposed spiral coils 5 arranged in pairs. The upper coil of each pair has an inlet pipe 6 at its outer end or circumference and is connected at its center with the center of the lower coil by a pipe 7, the outer end or circumference of the lower coil being connected to an outlet pipe 8. The inlet pipes of the several pairs are connected to pipes $a, b, c, d$ and the outlet pipes are connected to pipes $a', b', c', d'$, valves 9 and 10 respectively serving to control the flow through the inlet and the outlet pipes 6 and 8. Also located within the freezing tank is a series of vertical pipes 13 which are connected together at their upper and at their lower ends, the inlet pipe 14 being connected to a valve 15 in the pipe 3 whereby it may be connected with the pump 2; and the outlet pipe 16 being connected to valve 17 in pipe 3, whereby it may be connected to the spreaders 4. A pipe 18 is connected by a threeway valve 19 to the outlet pipe 11 and by a valve 20 with the pipe 3. Extending within the tank, one for each pair of spiral coils, is a number of thermometers 21 which are connected with signal bells 22. Manometers 23 may be connected by valves 24, 25 with the inlets or the outlets of each pair of coils.

The operation of the invention is as follows: The solution to be concentrated is forced by pump 2 into the tank or mold 1 through pipe 3 and spreaders 4. A refrigerant is then directed from the pipe $a$ into the upper pair of coils 5 until one of the ingredients (such as water) of the solution in the upper part of the tank is crystallized or frozen. Some of the soluble matters in the upper crystallized part of the tank then drop or drain off by gravity to the uncrystallized solution below. As the solution below the crystallized mass now contains more soluble matters, it is possible to freeze the solution surrounding the next pair of coils to a lower temperature. The most condensed matters also drain off from this layer and the successive layers may then each be frozen to still lower temperatures. The outlet pipe 11 of the tank 1 is opened after the freezing is completed and the most concentrated solutions permitted to drain off. The gradually more and more diluted solutions obtained from a previous operation, as described in my above mentioned patent, are successively forced by pump 2 through pipe 14 into the cooling pipes 13 and cooled to a temperature slightly above the freezing point of the crystallized ingredient. After which the cooled displacing fluid is conducted through pipe 16, valve 17 and pipe 3 to the spreaders 4 from which it passes into the tank and displaces the gradually more and more dilute solutions.

The refrigerant employed is preferably a compressed or liquefied gas previously cooled to almost 0° by circulating in the coils in the freezing tank when the ice separated in a previous operation is contained therein, this liquefied gas being evaporated within the coils to produce the freezing. But of course also cooled brine may be used.

Under ordinary circumstances, the pipes will become coated with hard impermeable ice thereby retarding the progress of the freezing and the displacement. This objection is overcome by the use of the independently controlled coils, by previously saturating with air, dry carbonic acid or other suitable gas the solution to be frozen, and by stirring the solution while the freezing is going on, preferably by injecting gas therein also by running lukewarm brine through the coils after the freezing is over. This also enables me to extract a higher percentage of water. The gas is conducted from the pipe 18 and through pipes 11 or 3 to the freezing tank. The gas employed for saturating or stirring the liquid should not contain any active oxygen so as to prevent the oxidation of the solution to be concentrated and the alteration of its taste. This gas or a liquid under pressure, may be employed to hasten the displacement of the concentrated solution interposed between the ice crystals, but the pressure should be so regulated that the displacement does not proceed too quickly in order to allow the concentrated solution time to diffuse in the displacing solution.

At the first operation and all future operations, if desired, after the most concentrated matter has been forced out or drained off, the refrigerant, in a warm state, is first directed through the upper coils, thereby causing a melting of the frozen mass in the upper part of the tank. This melted matter then displaces the soluble matter still held within the crystals of the frozen mass below, producing a more dilute solution than the most concentrated solution. The warm fluid is then directed through the next coil and so on until the whole frozen mass has disappeared and the resultant has been drained from the tank, thus producing first gradually more and more diluted solutions and pure water afterward. These gradually more and more dilute solutions may be used to displace the soluble matters held within the frozen mass of another operation, or they may be again frozen and have their remaining soluble matters displaced by the above mentioned process. By melting the ice within the tank the concentrated solution is not exposed to impure air and the labor of manually removing the ice from the tank is saved.

The invention has enabled me to displace the interposed concentrate solutions from solutions frozen at temperatures ranging from $-3t$ to $-6t$ ($t$ being the freezing point of the solution in degrees centigrades below the freezing point of water). Said temperature expressed in absolute degrees would range from $273-3$ ($273-T$) to $273-6$ ($273-T$), ($T$ being the absolute temperature at which the original solution starts to freeze, expressed in degree centigrade) according to the viscosity of the concentrated solution, and provided that the freezing point of the saturated solution is not passed.

The interposition of coils in the frozen solution does not interfere with the displacement provided that they are evenly distributed and that the freezing is carried on slowly and skilfully in order to prevent any part of the solution becoming cooled to a temperature at which the frozen mass would be impermeable.

This process is adapted for use in concentrating musts, drugs or other vegetable or mineral extracts, coffee, tea and meat extracts and the like.

Lemon juice and the like ought to be concentrated in aluminum, lead or glass coated, cement or masonry tanks, also in tanks silvered or coated with a special paint. The coils should also be coated with lead, paint or enamel.

With the exception of some strong liquorous wines, such as Madeira, Malaga, port and the like, which have their taste improved if a stream of air is caused to dissolve into the freezing liquid, the concentration of wine and fruit juices should always take place in an atmosphere of dry carbonic acid or other inert or reducing gas and the diluted displacing solutions should be stored in a refrigerated room. Beer also being very easily altered should never be allowed to warm or come into contact with air.

Meat juice should not only be concentrated out of contact with active oxygen but the whole operation should be carried on in a refrigerated room. The meat should be methodically exhausted with luke warm water at about 50°, and the solution cooled and filtered, once through a sieve to separate the grease and then through another filter like under strong dry carbonic acid pressure to separate the germs. After this about 9/10 of the water may be separated by freezing according to the above process and the other tenth may be removed by evaporation in vacuum at a temperature not over 60° C. and in an atmosphere of dry carbonic acid. The extract of meat thus prepared has a delicious flavor and contains many very substantial ingredients which are lost or altered by the usual process.

In concentrating alcohol, glycerin, strong brine solutions and other solutions having their freezing points many degrees below the freezing point of water, the displacing solutions should be cooled by an independent refrigerating apparatus.

Referring to Fig. 3 which illustrates another apparatus for carrying out my process, $1^a$ indicates the tank having mounted therein the independently controllable coils $5^a$ being arranged in pairs as in the first embodiment, the connecting pipes $7^a$ being deflected outwardly and connected to the circumference of the lower coil instead of the center while the outlet $8^a$ is connected to the center of the lower coil, thereby permitting the use of a stirrer or agitator. This stirrer comprises a vertical shaft 27 and horizontal arms 28 positioned between the coils and is turned by a shaft connected to the shaft 27 by gearing 30. The stirrer acts to agitate the solution during freezing and prevent the uneven freezing of the mass. When other more economical means are not advisable I have shown for the sake of simplicity two pairs of coils connected to the pipes $a$, $a'$, $d$, $d'$. In this apparatus, the coils are employed not only for the refrigerant but for cooling the solution to be frozen and the displacing solutions. For this purpose pipes $14^a$ and $16^a$ connect the pipe 3 with the pipes $a$, $a'$, $d$ and $d'$ whereby through valves $15^a$ and $17^a$, and valves 26, the solutions may be directed from the pump 2 into the coils $5^a$ and back through the pipe 3 to the freezing tank. The operation is otherwise the same as that set forth in the description of the other embodiment.

In Fig. 4 I have shown diagrammatically a complete beet sugar factory in which my invention may be carried out. The defecated sugar juice, obtained by the diffusion process generally in use, drips from the press filters 41 at a temperature of about 60° C. and has an average density of 1.050 corresponding to 10% weight of sugar, that is 11 weights of sugar in one hundred water. Its freezing point should be $0' - 0.059 \times 11 = 0.65°$ C. below zero if the juice were pure. In fact however, the juice contains other substances which lower its freezing point to about $-0.80$ or 272.2 absolute degrees. With my improvements I can cool the mass to $3 \times 0.8 = 2.4$ (270.6 absolute degrees) without interfering with the displacement. I first pump, by pump 42, the warm juice into the interchangers 43, where it is cooled by a suitable quantity of cooling water, and through pipe 44 and $11^c$ to the freezing tank $1^A$ where it is frozen at a temperature not below 270.6 absolute degrees centigrade, by evaporating, in the upper coils first and the other coils afterward, liquefied gas coming from the condenser 45 through pipes 46 and 47, regulating valve 48 and pipes 49, $a$ and $d$, returning through pipes $a'$, $d'$, 50 to gas compressor 51. While the freezing is going on in tank $1^a$ I fill tank $1^b$ with a supply of cool juice from the interchangers 43. As soon as tank A has reached the required temperature I open cock or valve 52 and allow the most concentrated liquor flowing from the frozen mass to descend through pipe $11^c$ to the reconcentrating tank $1^M$. When the concentrated solution has almost ceased to flow from the ice crystals, I cause the liquefied but still warm gas, coming from the condenser to circulate through the upper coils in tank $1^A$, without passing the gas through the pressure regulating valve 48. The luke warm gas melts the ice crystals at the upper end of the tank, and this melted ice strains through the ice crystals filling the lower end of the tank, displaces the concentrated juice interposed amidst said crystals and causes concentrated juice first and gradually more and more diluted sugary solutions afterward, to flow through pipe $11^c$ into tank $1^M$. When the flowing liquid is weaker than the original juice, I cause the more and more diluted solutions dripping from the ice to fill reservoirs 53, and when almost pure water flows I circulate the warm compressed gas in the lower coils of the freezing tank, thus melting the remaining ice. This ice cold water is lead through pipe 54 to the surface condenser 55 of the steam engine or to the jacket of a gas engine, to become heated. The water is then filtered, in filters 56, and is used in diffusers 57 to displace the sugar from another supply of beets. If the juice has been previously saturated with $CO$, under pressure the displacement is much quicker and easier and the separated ice quite pure. Meanwhile the solution in tank $1^b$ has been frozen and tank $1^c$ has been filled. Instead of melting the ice in tank $1^B$ I displace, as usual, the concentrated solution with the more and more diluted solutions obtained in the operation of tank $1^A$, cooling if necessary said solutions in a coil of tank $1^B$, and make use of the depurated ice crystals filling tank $1^B$ to cool the displacing weak solutions to be strained through the ice separated in tank $1^c$, also to cool the second solution to be frozen in tank $1^A$ and the liquefied gas to be evaporated in order to freeze said solution, and so on for an unlimited number of operations. The reconcentration of the concentrated solution filling the tanks 1ᴹ, 1ᴸ and 1ᴷ is carried on in the same way as the first concentration, the only difference being that said solution having a density of about 1.110 and containing 25% sugar, that is 33 weight sugar in 100 water, its freezing point 2 degrees centigrade below zero (27 absolute degrees) and may be cooled to about 267 absolute degrees (−6°). The reconcentrated solution containing about 50% sugar (100 weight sugar in 100 water), after having been conducted by pipes 4 to the interchanger 43 and heated by the hot juice dripping from the press filters 41, is pumped a vacuum concentrator 58 where it is worked in the usual way in order to obtain crystallized sugar. If the quantity of sugar juice to be concentrated is very large, it is advisable to employ an additional compressor 51ᵃ with its condenser 45ᵃ and regulating valve 48ᵃ. The sugar juice concentrated by freezing, not having been subjected to a high temperature, will give a higher percentage of crystallized sugar of a lighter shade than if concentrated in the usual way.

Having described my invention what I claim as new, is:

1. The process of concentrating solutions which consists in freezing the upper portion of the liquid first to crystallize one of the ingredients thereof, freezing the liquid below the upper frozen portion at a temperature lower than the temperature of the upper portion, and displacing the ingredients interposed amidst the frozen crystals.

2. The process of concentrating solutions which consists in saturating the solution with a gas having no chemical action on the solution, freezing the saturated solution to crystallize one of the ingredients thereof, and removing the other ingredients from amidst the frozen crystals.

3. The process of concentrating solutions which consists in freezing the solution to crystallize one of the ingredients thereof, injecting a gas into the solution during the freezing, and displacing the other ingredients from amidst the crystals.

4. The process of concentrating solutions which consists in freezing an ingredient of the liquid in layers beginning at the top, and removing the other ingredients from amidst the frozen mass.

5. The process of concentrating solutions which consists in freezing the liquid to crystallize one ingredient thereof, displacing the other ingredient from amidst the crystals, by a liquid under pressure, and in regulating the pressure under which said displacing liquid is used, in such manner as to secure the most efficient diffusion of the concentrated solution into the displacing liquid.

6. The process of concentrating solutions which consists in freezing the liquid to crystallize one of the ingredients thereof, and displacing the other ingredients by a displacing liquid under pressure of a gas free from active oxygen.

7. The process of concentrating solutions which consists first in freezing the solution throughout successive layers downwardly and then in displacing the concentrated matter by a displacing fluid.

8. The process of concentrating solutions which consists in freezing portions of the solution, in introducing a displacing liquid above the frozen mass, and then in introducing an inert gas under pressure above said displacing liquid in such manner as to cause the concentrated portions to be displaced downwardly.

9. The process of concentrating solutions which consists in freezing portions of the solution in a tank to crystallize one of the ingredients thereof, next in displacing the other ingredients by the introduction of a displacing fluid above the frozen portions to displace the concentrated matter downwardly, and lastly, in melting the frozen portions by successive layers downwardly to provide periodic and additional supplies of displacing fluid.

10. The process of concentrating solutions which consists in freezing a solution in a tank to crystallize one ingredient thereof, next in cooling a fluid by the frozen mass thus formed, then in displacing the other ingredients by the cooled fluid, and lastly in melting the frozen mass within the tank to provide additional displacing fluid.

11. The process of concentrating solutions which consists in freezing portions of the solution, in introducing a diluted portion of the solution above the frozen mass, then in introducing a gas, free from active oxygen and under pressure, above said diluted solution, and finally in varying the pressure under which said inert gas is introduced above the dilute solution, whereby a maximum degree of efficiency is attained in the downward displacement of the concentrated portions.

The foregoing specification signed at Turin, Piedmont, Italy.

EUDO MONTI.

In the presence of two witnesses:
GOTTARDO C. PIRONI,
C. GIACHETTI.